United States Patent
Kim et al.

(10) Patent No.: US 7,951,499 B2
(45) Date of Patent: May 31, 2011

(54) FUEL CELL SYSTEM WHICH COOLS CONDENSER AND MIXES AIR WITHOUT REQUIRING SEPARATE POWER UNITS

(75) Inventors: Ju Yong Kim, Seoul (KR); Sung Chul Lee, Yongin-si (KR); Chan Ho Lee, Yongin-si (KR); Dong Myung Suh, Yongin-si (KR); Jin Goo Ahn, Yongin-si (KR); Jin Kwang Kim, Yongin-si (KR); Dong Uk Lee, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 998 days.

(21) Appl. No.: 11/651,101

(22) Filed: Jan. 9, 2007

(65) Prior Publication Data

US 2007/0166579 A1    Jul. 19, 2007

(30) Foreign Application Priority Data

Jan. 17, 2006    (KR) .................. 10-2006-0005089

(51) Int. Cl.
*H01M 8/04*    (2006.01)
(52) U.S. Cl. ........ 429/436; 429/437; 429/414; 429/492; 429/515
(58) Field of Classification Search ............ 429/34, 429/26, 19, 20, 30
See application file for complete search history.

(56) References Cited

U.S. PATENT DOCUMENTS

| | | | |
|---|---|---|---|
| 2002/0058171 A1* | 5/2002 | Birk | 429/26 |
| 2002/0112479 A1 | 8/2002 | Keefer | |
| 2003/0183374 A1 | 10/2003 | Voss | |
| 2004/0033402 A1* | 2/2004 | Faye et al. | 429/26 |
| 2005/0058885 A1* | 3/2005 | Brocklin et al. | 429/65 |
| 2005/0087437 A1* | 4/2005 | Sakurai et al. | 204/172 |

FOREIGN PATENT DOCUMENTS

| | | |
|---|---|---|
| EP | 1 468 857 | 10/2004 |
| GB | 2 392 003 | 2/2004 |
| JP | 10-097862 | 4/1998 |
| JP | 2003-095609 | 4/2003 |
| KR | 10-2000-0022545 | 4/2000 |
| WO | WO 2005/112158 | 11/2005 |

OTHER PUBLICATIONS

Search report from the European Patent Office issued in Applicant's corresponding European Patent Application No. 07100669.6 dated Feb. 22, 2008.
Office action from the State Intellectual Property Office of P.R. China issued in Applicant's corresponding Chinese Patent Application No. 200710002436.4 dated Oct. 17, 2008.

* cited by examiner

*Primary Examiner* — Raymond Alejandro
(74) *Attorney, Agent, or Firm* — Robert E. Bushnell, Esq.

(57) ABSTRACT

A fuel cell system comprises: a fuel container for storing fuel liquefied with pressure; a reformer for generating hydrogen from the fuel through a catalyst reaction based on heat energy; an electric generator for generating electricity by transforming energy of an electrochemical reaction between hydrogen and oxygen into electric energy; a condenser for condensing water produced in the electric generator; and a heat exchanger passing through the condenser for cooling the condenser by latent heat of the fuel. With this configuration, cooling water cooled by latent heat of a fuel container is employed to cool the condenser without using a separate cooler. Furthermore, air is mixed with butane fuel without using a separate power unit, so that it is possible to achieve a more compact and highly efficient fuel cell.

8 Claims, 4 Drawing Sheets

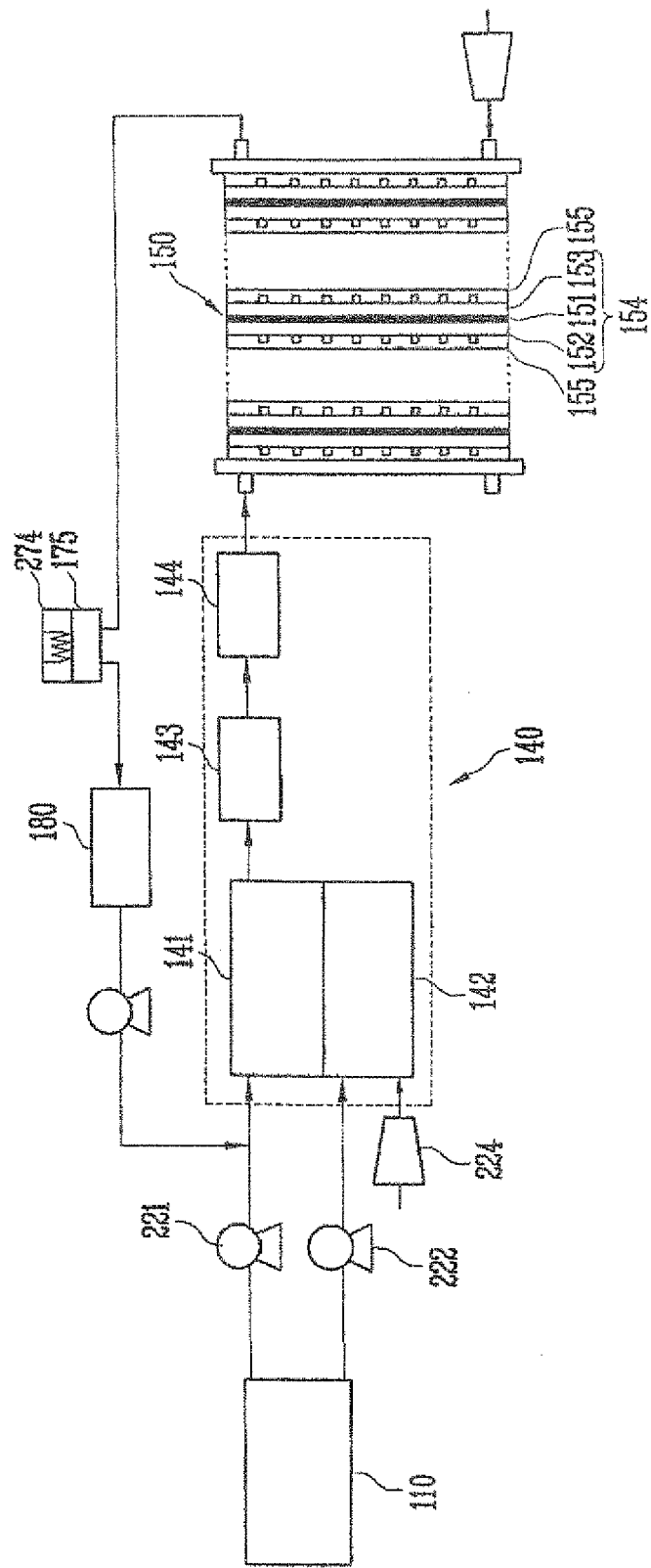

FUEL CELL SYSTEM WHICH COOLS CONDENSER AND MIXES AIR WITHOUT REQUIRING SEPARATE POWER UNITS

CLAIM OF PRIORITY

This application makes reference to, incorporates the same herein, and claims all benefits accruing under 35 U.S.C. §119 from an application for FUEL CELL SYSTEM USING BUTANE earlier filed in the Korean Intellectual Property Office on the 17 Jan. 2006 and there duly assigned Serial No. 10-2006-0005089.

BACKGROUND OF THE INVENTION

1. Technical Field

The present invention relates to a fuel cell system, and more particularly, to a fuel cell system using a portable butane fuel.

2. Related Art

In general, a fuel cell is a power generating system that directly transforms chemical energy into electric energy by an electrochemical reaction between hydrogen and oxygen. In supplying hydrogen to a fuel cell system, pure hydrogen can be directly used, or methanol, ethanol, natural gas or the like can be reformed. Furthermore, in supplying oxygen to the fuel cell system, pure oxygen can be directly used, or oxygen contained in air can be supplied by an air pump or the like.

Meanwhile, the fuel cells are classified into: a polymer electrolyte membrane fuel cell (PEMFC) and a direct methanol fuel cell (DMFC), which operate at room temperature or a temperature of less than 100° C.; a phosphoric acid fuel cell (PAFC) which operates at a temperature of 150° C.~200° C.; a molten carbon fuel cell (MCFC) which operates at a temperature of 600° C.~700° C.; a solid oxide fuel cell (SOFC) which operates at a high temperature of more than 1000° C.; and so on. These fuel cells operate on basically the same principle, but they are different in the type of used fuel, catalyst, electrolyte, and so on.

Among the fuel cells, the polymer electrolyte membrane fuel cell (PEMFC) uses hydrogen obtained by reforming methanol, ethanol, natural gas, etc., and has advantages as compared with other types of fuel cells in that its output performance is very excellent, its operation temperature is low, and its start and response are quickly performed. Thus, the PEMFC can be widely used as a distributed power source for a house and a public building, a small portable power source for a portable electronic apparatus, etc., as well as a transportable power source for a vehicle.

In a polymer electrolyte membrane fuel cell system, the fuel is a material such as methanol, ethanol, natural gas and the like, which can be reformed to produce hydrogen. Furthermore, a mixture of butane fuel and water is called mixed fuel.

The polymer electrolyte membrane fuel cell basically includes a fuel container for storing fuel, a reformer for reforming the fuel to produce hydrogen, and an electric generator for generating predetermined voltage and current by electrochemical reaction between hydrogen and oxygen.

When the fuel is supplied to the reformer, fuel pumps requiring a separate power source are needed. Furthermore, the reformer is supplied with oxygen by an air feeder requiring a separate power source, so that the fuel is burned. In the meantime, water produced in the electric generator is cooled and condensed in a condenser. In order to facilitate the cooling effect of the condenser, a cooler requiring a separate power source is needed.

Thus, while operating such a polymer electrolyte membrane fuel cell system, units requiring separate power sources are needed. Consequently, power for driving the fuel cells is additionally needed, thereby deteriorating efficient operation of the fuel cell.

SUMMARY OF THE INVENTION

Accordingly, it is an object of the present invention to provide a fuel cell system with an air feeder and a cooler which require no additional power source.

The foregoing and/or other objects of the present invention are achieved by providing a fuel cell system comprising: a fuel container for storing fuel liquefied with pressure; a reformer for generating hydrogen from the fuel through a catalyst reaction based on heat energy; an electric generator for generating electricity by transforming energy of an electrochemical reaction between hydrogen and oxygen into electric energy; a condenser for condensing water produced in the electric generator; and a heat exchanger passing through the condenser for cooling the condenser by latent heat of the fuel.

According to an aspect of the invention, the fuel cell system further includes a cooling water container which is in contact with the fuel container and stores cooling water. Furthermore, the fuel cell system includes an insulating material placed outside the cooling water container.

According to an aspect of the invention, the cooling water container and the heat exchanger are connected so as to communicate with each other. Furthermore, the heat exchanger includes a guide pipe through which the cooling water flows. Also, the heat exchanger is in contact with at least one side of the condenser. In this case, the reformer is fed with air by negative pressure generated when the fuel passes through a Venturi pipe.

According to an aspect of the invention, the fuel includes a gaseous hydrocarbonaceous material, particularly, butane. Furthermore, the fuel container includes a portable butane fuel container.

According to an aspect of the invention, the fuel cell system includes a polymer electrolyte membrane fuel cell system.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 4 is a schematic view of a polymer electrolyte membrane fuel cell system.

DETAILED DESCRIPTION OF THE INVENTION

Hereinafter, preferable embodiments of the present invention will be described with reference to accompanying drawings, wherein like numerals refer to like elements and repetitive descriptions will be avoided as appropriate.

Figure 1:
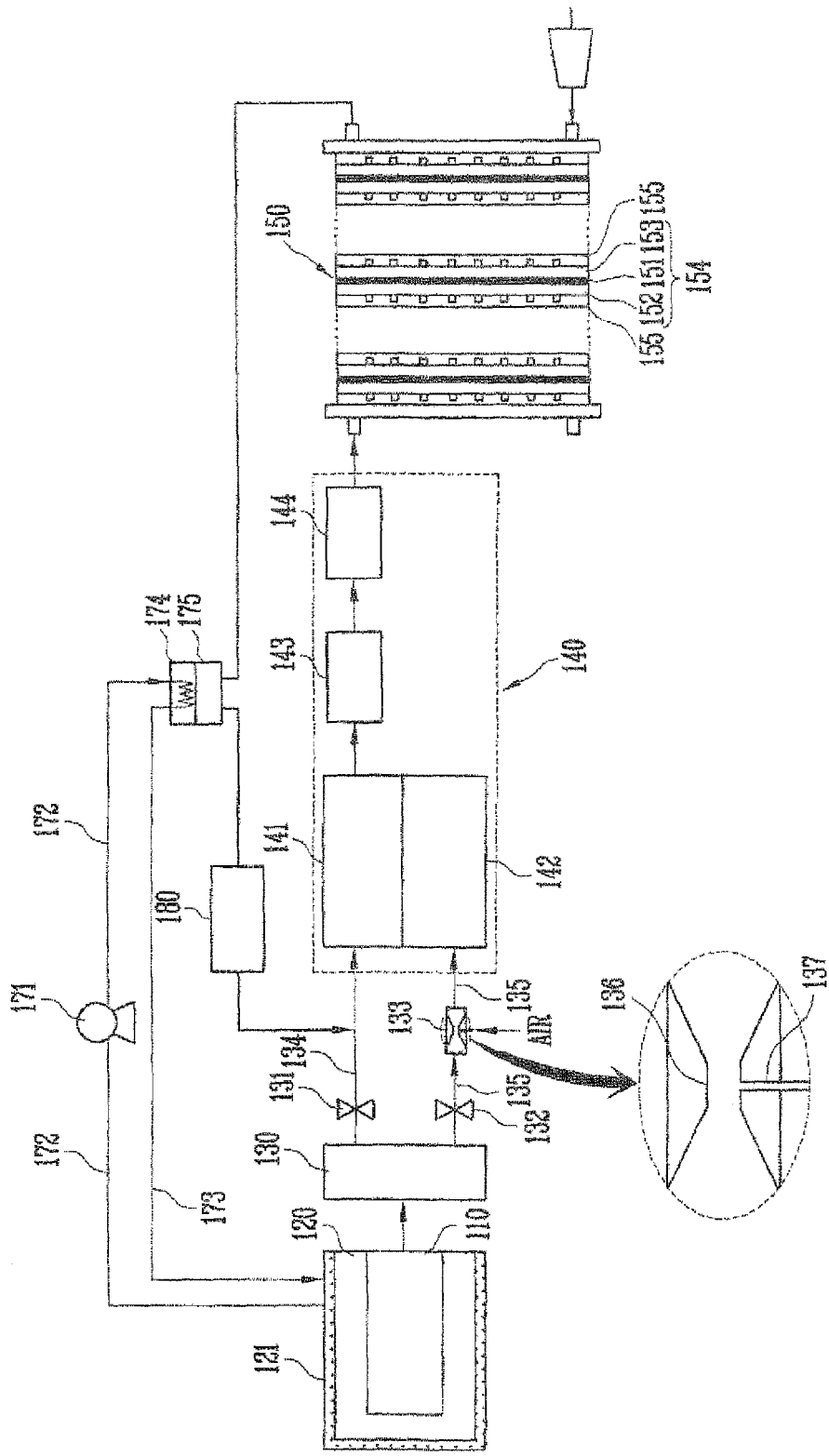
FIG. 1 is a schematic view of a polymer electrolyte membrane fuel cell system according to an embodiment of the present invention.

FIG. 1 is a schematic view of a polymer electrolyte membrane fuel cell system according to an embodiment of the present invention.

In the fuel cell system according to an embodiment of the present invention, the fuel can be butane fuel which is generally on the market, but the fuel is not limited thereto. Alternatively, the fuel may include a gaseous hydrocarbonaceous material such as liquefied natural gas (LNG), propane, pure butane, etc. In the common butane fuel, pure butane and propane are mixed in a predetermined ratio. Furthermore, a mixture of the butane fuel and water is called mixed fuel.

Referring to FIG. 1, a polymer electrolyte membrane fuel cell according to an embodiment of the present invention includes a fuel container 110, a cooling water container 120, an air mixer 133, a reformer 140, an electric generator 150, a heat exchanger 174, a condenser 175, and a water-storing container 180.

The fuel container 110 is airtight and resists pressure, thereby storing the fuel. The fuel container 110 can use a common portable butane fuel container which is on the market. Hereinafter, the portable butane fuel container will be described as an example of the fuel container 110. The fuel container 110 stores the butane fuel liquefied with predetermined pressure. However, the ambient temperature around the fuel container 110 gasifies some of the liquefied butane fuel so that the gasified butane fuel increases the internal pressure in the fuel container 110, thereby discharging the butane fuel to a distributor 130 without separate units when a nozzle (not shown) of the fuel container 110 is opened. In the meantime, the fuel container 110 is cooled by latent heat while the butane fuel changes from a liquid state to a gas state.

Figure 2:
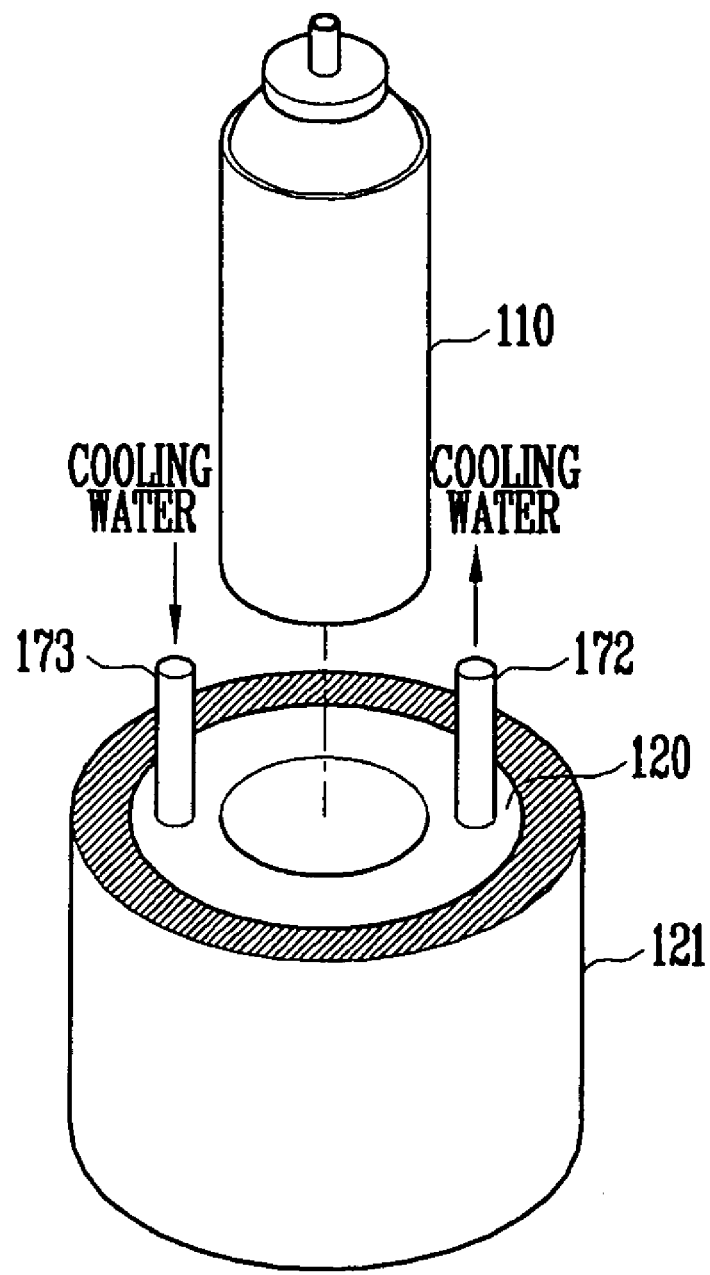
FIG. 2 is a perspective view of a cooling water container provided in a fuel container according to an embodiment of the present invention.

FIG. 2 is a perspective view of a cooling water container provided around the fuel container according to an embodiment of the present invention. Referring to FIG. 2, the cooling water container 120 is in contact with the outside of the fuel container 110, and an insulating material 121 is provided on the outside of the cooling water container 120. In this case, cooling water stored in the cooling water container 120 is cooled due to contact with the surface of the fuel container 110 which is cooled by the foregoing cooling effect due to the latent heat, and the cooled state of the cooling water is maintained by the insulating material 121.

Referring back to FIG. 1, the cooling water is supplied, by a pump 171, to the heat exchanger 174 through a cooling water supplying pipe 172. Preferably, the pump 171 is selected so as to be as small as possible so as to require minimum power. The cooling water moves along a channel formed in the heat exchanger 174, and cools the heat exchanger 174 through heat exchange. Then, the condenser 175 contacting the heat exchanger 174 is cooled, thereby enhancing the condensing effect of the condenser 175. After exchanging heat with the heat exchanger 174, the cooling water is recovered in the cooling water container 120 through a cooling water recovering pipe 173, and is cooled again. With this configuration, the condenser 175 is cooled by the cooling effect of the fuel container 110 without using a cooler requiring substantial separate power, but only using the pump 171 which requires relatively small power. Therefore, a more compact and highly efficient fuel cell is provided.

The butane fuel supplied by the fuel container 110 to the distributor 130 is divided into two parts. Some butane fuel is supplied as reforming fuel to a reforming reaction part 141 of the reformer 140 (to be described later) through a first fuel supplying pipe 134, and other fuel is supplied through a second fuel supplying pipe 135 as combustion fuel to a heat source part 142 of the reformer 140. The first fuel supplying pipe 134 and the second fuel supplying pipe 135 are provided with valves 131 and 132, respectively. Therefore, without separate driving units, the amount of supplied reforming fuel and combustion fuel can be controlled by adjusting an open state of the valves 131 and 132, respectively.

Meanwhile, the combustion fuel has to be mixed with a predetermined amount of air needed for combustion reaction, and then supplied to the heat source part 142 of the reformer 140. In this case, the air can be mixed with the combustion fuel through the air mixer 133 without a separate unit requiring power. The center of the air mixer 133 is provided with a Venturi pipe 136, and the center of the Venturi pipe 136 is provided with an inhaling pipe 137 to communicate with external air. When the combustion fuel is introduced through the Venturi pipe 136, the speed of the combustion fuel increases because the channel gets narrower. Then, the pressure is lowered by Bernoulli's theorem, so that negative pressure is generated, thereby inhaling the external air through the inhaling pipe 137. Thus, the combustion fuel is mixed with the air, and the mixed fuel is supplied to the heat source part 142 of the reformer 140 through the second fuel supplying pipe 135. Consequently, the combustion fuel and the air are mixed without separate units requiring power. Likewise, without separate units requiring power, the reforming fuel can be also mixed with water stored in the water-storing container 180.

The reformer 140 includes the reforming reaction part 141 and the heat source part 142. The reforming reaction part 141 generates reforming gas with a hydrogen base by, reforming the reforming fuel through a vapor reforming catalyst reaction. The combustion fuel together with the air is introduced into the heat source part 142, and is burned to transfer heat to the reforming reaction part 141. Meanwhile, the reforming gas contains a predetermined amount of carbon monoxide. If the reforming gas containing carbon monoxide is introduced into the electric generator 150, the catalyst is poisoned and thus the performance of the fuel cell system is deteriorated. Therefore, to reduce carbon monoxide contained in the reforming gas, a water gas transformation catalyst reaction and a selective oxidation catalyst reaction are applied to the reforming gas through a water gas transformer 143 and a selective oxidizer 144. Thus, carbon monoxide contained in the reforming gas is removed, and hydrogen of high concentration is obtained.

The electric generator 150 includes a membrane-electrode assembly 154 to oxidize hydrogen and reduce oxygen, and a bipolar plate 155 to supply hydrogen and oxygen to the membrane-electrode assembly 154. The membrane-electrode assembly 154 can have a typical structure for a membrane-electrode assembly in which an electrolyte membrane 151 is interposed between an anode electrode 152 and a cathode electrode 153. In the electric generator 150, electrochemical reactions can be represented by the following formulas:

$$\text{Anode: } H_2 \rightarrow 2H^+ + 2e^-$$

$$\text{Cathode: } (1/2)O_2 + 2H^+ + 2e^- \rightarrow H_2O$$

$$\text{Total: } H_2 + (1/2)O_2 \rightarrow H_2O + \text{electric current} + \text{heat}$$

The electric generator 150 is connected with the foregoing condenser 175 at one end thereof. The condenser 175 condenses high temperature vapor discharged from the electric generator 150 by the foregoing cooling effect, and the condensed water is stored in the water-storing container 180.

Figure 3:
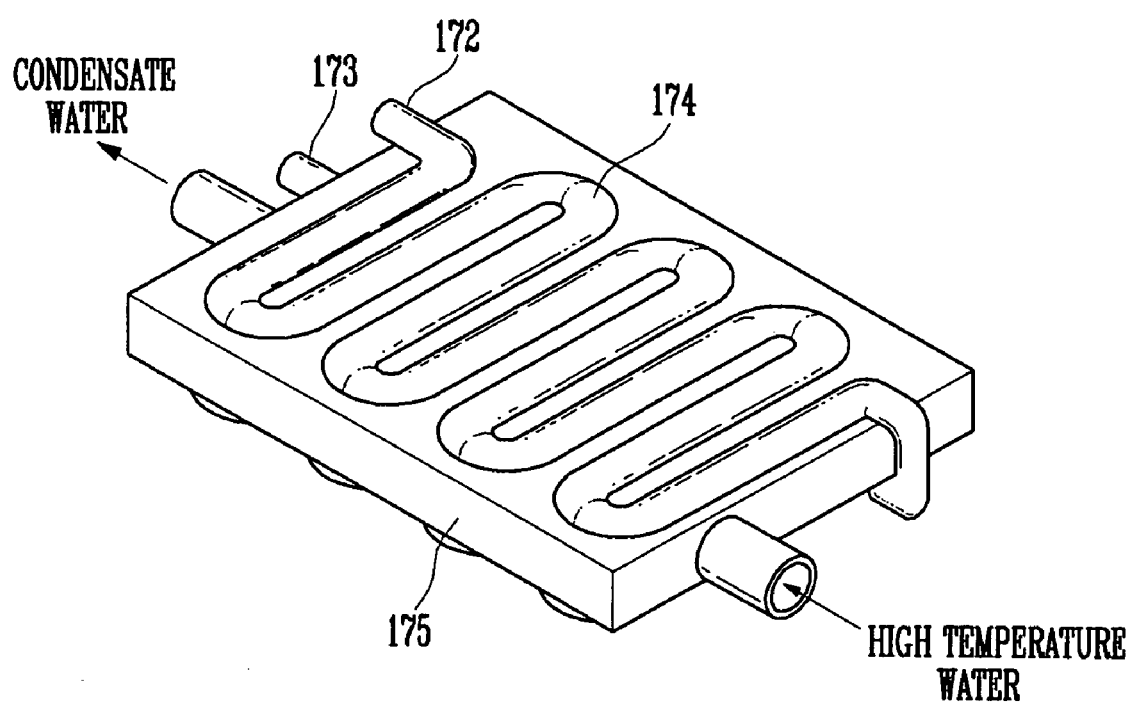
FIG. 3 is a perspective view of a heat exchanger provided in a condenser according to an embodiment of the present invention.

FIG. 3 is a perspective view of a heat exchanger provided in a condenser according to an embodiment of the present invention. Referring to FIG. 3, the heat exchanger 174 is formed as a hollow pipe, and is bent enough times for the heat exchange while being in contact with the upper and lower surfaces of the condenser 175. One end of the heat exchanger 174 communicates with the cooling water supplying pipe 172, and the other end of the heat exchanger 174 communicates with the cooling water recovering pipe 173. The cooling water is introduced into the heat exchanger 174 through the cooling water supplying pipe 172 and flows along the inside of the heat exchanger 174, thereby exchanging heat with the heat exchanger 174. Then, the heat exchanger 174 is cooled, and exchanges heat with the condenser 175 in contact therewith. Thus, the condenser 175 is cooled and more easily condenses high temperature vapor produced by the electric generator 150. After the heat exchange, the cooling water is discharged through the cooling water recovering pipe 173. In this embodiment, the heat exchanger 174 is provided on both surfaces of the condenser 175, but the invention is not limited thereto. Alternatively, the heat exchanger 174 may be provided on one surface of the condenser 175.

FIG. 4 is a schematic view of a polymer electrolyte membrane fuel cell system.

In the accompanying drawings, like numerals refer to like elements. Therefore, with regard to the reference numerals for the elements of FIG. 4 which are not described herein, refer to descriptions of elements having the same numerals in the embodiments above.

In the polymer electrolyte membrane fuel cell system of FIG. 4, the fuel is a material such as methanol, ethanol, natural gas and the like, which can be reformed to produce hydrogen. Furthermore, a mixture of butane fuel and water is called mixed fuel.

Referring to FIG. 4, the polymer electrolyte membrane fuel cell basically includes a fuel container 110 for storing fuel, a reformer 140 for reforming the fuel to produce hydrogen, and an electric generator 150 for generating predetermined voltage and current by electrochemical reaction between hydrogen and oxygen.

When the fuel is supplied to the reformer 140, fuel pumps 221 and 222 requiring a separate power source are needed. Furthermore, the reformer 140 is supplied with oxygen by an air feeder 224 requiring a separate power source, so that the fuel is burned. In the meantime, water produced in the electric generator 150 is cooled and condensed in a condenser 175. To facilitate the cooling effect of the condenser 175, a cooler 274 requiring a separate power source is needed.

Thus, while operating such a polymer electrolyte membrane fuel cell system, units requiring the separate power sources are needed. Consequently, power for driving the fuel cells are also needed, thereby deteriorating efficient operation of the fuel cell.

According to an embodiment of the present invention, there is provided a fuel cell system in which cooling water cooled by latent heat of a fuel container is employed for cooling the condenser without using a separate cooler. Furthermore, air is mixed with butane fuel without using a separate power unit, so that it is possible to achieve a more compact and highly efficient fuel cell.

Although a few embodiments of the present invention have been shown and described, it will be appreciated by those skilled in the art that changes might be made in this embodiment without departing from the principles and spirit of the invention, the scope of which is defined in the claims and their equivalents.

What is claimed is:

1. A polymer electrolyte membrane fuel cell comprising:
   a fuel container storing fuel liquefied with pressure;
   a reformer generating hydrogen from the fuel through a catalyst reaction based on heat energy;
   an electric generator generating electricity by transforming energy of an electrochemical reaction between hydrogen and oxygen into electric energy;
   a condenser condensing water produced in the electric generator;
   a heat exchanger, passing through the condenser, cooling the condenser by latent heat of the fuel;
   a cooling water container storing water, the water being in direct surrounding contact with an outside surface of the fuel container and
   an insulating material disposed on an exterior of the cooling water container.

2. The fuel cell system according to claim 1, wherein the cooling water container and the heat exchanger are connected so as to communicate with each other.

3. The fuel cell system according to claim 2, wherein the heat exchanger, comprises a guide pipe through which the cooling water flows.

4. The fuel cell system according to claim 3, wherein the heat exchanger, is in contact with at least one side of the condenser.

5. The fuel cell system according to claim 4, wherein the reformer is fed with air by negative pressure generated when the fuel passes through a Venturi pipe.

6. The fuel cell system according to claim 5, wherein the fuel includes a gaseous hydrocarbonaceous material.

7. The fuel cell system according to claim 6, wherein the fuel includes butane.

8. The fuel cell system according to claim 7, wherein the fuel container comprises a portable butane fuel container.

* * * * *